US009519280B2

(12) United States Patent
Aizawa et al.

(10) Patent No.: US 9,519,280 B2
(45) Date of Patent: Dec. 13, 2016

(54) NUMERICAL CONTROL DEVICE FOR MACHINE TOOL

(71) Applicant: FANUC Corporation, Minamitsuru-gun, Yamanashi (JP)

(72) Inventors: Nobuaki Aizawa, Minamitsuru-gun (JP); Kouichi Noda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 14/681,417

(22) Filed: Apr. 8, 2015

(65) Prior Publication Data

US 2015/0309498 A1 Oct. 29, 2015

(30) Foreign Application Priority Data

Apr. 24, 2014 (JP) .................. 2014-090132

(51) Int. Cl.
*G05B 19/19* (2006.01)
*G05B 7/02* (2006.01)
*G05B 19/416* (2006.01)

(52) U.S. Cl.
CPC .............. *G05B 19/19* (2013.01); *G05B 7/02* (2013.01); *G05B 19/416* (2013.01); *G05B 2219/41084* (2013.01)

(58) Field of Classification Search
CPC ......... G05B 19/19; G05B 7/02; G05B 19/416; G05B 2219/41084
See application file for complete search history.

(56) References Cited

U.S. PATENT DOCUMENTS

| 3,893,011 A * | 7/1975 | Inaba .................. G05B 19/40 318/573 |
| 5,059,881 A * | 10/1991 | Fujita ................. G05B 19/404 318/569 |
| 6,404,160 B2 * | 6/2002 | Sagasaki .............. G05B 19/18 318/560 |
| 6,591,148 B1 * | 7/2003 | Masuda .............. G05B 19/184 409/274 |
| 6,625,498 B1 * | 9/2003 | Kurakake .......... G05B 19/0421 700/19 |
| 2005/0168178 A1 * | 8/2005 | Toyozawa ........... G05B 19/186 318/68 |

(Continued)

FOREIGN PATENT DOCUMENTS

| JP | H07-16849 B2 | 1/1989 |
| JP | H11-39017 A | 2/1999 |
| JP | 2009-282829 A | 12/2009 |

*Primary Examiner* — Shawki S Ismail
*Assistant Examiner* — Muhammad S Islam
(74) *Attorney, Agent, or Firm* — Drinker Biddle & Reath LLP (57) ABSTRACT

A numerical control device for a machine tool includes: a timing calculation unit configured to calculate a start timing of a post-reverse movement command by which a position, where the sum of velocities generated in response to a pre-reverse movement command and the post-reverse movement command becomes zero, is equal to a position distanced by an in-position width from the end point of the pre-reverse movement command; and a movement command start unit configured to start the post-reverse movement command in accordance with the start timing calculated by the timing calculation unit.

4 Claims, 5 Drawing Sheets

(56) References Cited

U.S. PATENT DOCUMENTS

| | | | | |
|---|---|---|---|---|
| 2009/0248203 | A1* | 10/2009 | Nakamura | G05B 19/4103 700/251 |
| 2011/0035044 | A1* | 2/2011 | Takahashi | G05B 19/4069 700/178 |
| 2011/0166693 | A1* | 7/2011 | Nishibashi | G05B 19/4103 700/187 |
| 2013/0173046 | A1* | 7/2013 | Kawana | G05B 19/404 700/186 |

* cited by examiner

NUMERICAL CONTROL DEVICE FOR MACHINE TOOL

RELATED APPLICATION DATA

This application claims priority under 35 U.S.C. §119 and/or §365 to Japanese Application No. 2014-090132 filed Apr. 24, 2014, the entire contents is incorporated herein by reference.

BACKGROUND OF THE INVENTION

1. Field of the Invention

The present invention relates to a numerical control device that controls a machine tool, and in particular, a numerical control device that speeds up a reversing operation of a machine tool.

2. Description of the Related Art

In a conventional operation for reversing the direction of movement using a machine tool, positioning accuracy when reversing is ensured by starting a post-reverse movement command (a movement command that is subsequent to a pre-reverse movement command) when the servo delay amount of the pre-reverse movement command has become equal to or lower than the in-position width (required accuracy), that is, within the margin of the predetermined error, when reversing (see Japanese Examined Patent Publication No. H7-16849).

Furthermore, in order to speed up a reversing operation, feed-forward control is used to set the servo delay amount to substantially zero, and the post-reverse movement command is started (overlapped), when the remaining amount of movement of the pre-reverse movement command has become equal to or lower than the in-position width (required accuracy) when reversing, thereby speeding up the reversing operation (see Japanese Patent Application Publication No. H11-39017 and Japanese Patent Application Publication No. 2009-282829).

However, in general, an acceleration and deceleration is applied to movement commands, and when reversing, due to the combination of the acceleration/deceleration of the pre-reverse movement command and the acceleration/deceleration of the post-reverse movement command, the timing at which the final combined movement command is reversed is delayed with respect to the start of the post-reverse movement command. Therefore, in the prior art, the actual accuracy when reversing is even better than the in-position width (required accuracy), but the cycle time is slowed accordingly.

SUMMARY OF THE INVENTION

It is an object of the present invention to provide a numerical control device for controlling a machine tool whereby, in an operation in which the direction of movement is reversed, the cycle time can be shortened by advancing the reverse start timing of the reversing operation, as early as possible, within the in-position width.

The numerical control device for controlling a machine tool according to several embodiments of the present invention has a characteristic feature in determining a start (overlap) timing of a post-reverse command whereby a position where the sum of velocities generated in response to a pre-reverse command and the post-reverse command becomes zero is equal to a position distanced by an in-position width from the end position of the pre-reverse movement command, and starting the post-reverse movement command at this timing. A reversing operation denotes a case where an object being processed is reversed with respect to a tool, or a case where the tool is reversed with respect to the object being processed.

The numerical control device for a machine tool according to the present invention, when carrying out processing of an object by controlling axes of a machine tool in accordance with a processing program including a command by which a direction of movement of one or more axes is reversed, starts a post-reverse movement command in such a manner that a reversal position of the one or more axes comes within an in-position width of an end position of a pre-reverse movement command; and includes: a timing calculation unit configured to calculate a start timing of the post-reverse movement command by which a position, where a sum of the velocities generated in response to the pre-reverse movement command and the post-reverse movement command becomes zero, is equal to a position distanced by the in-position width from the end position of the pre-reverse movement command; and a movement command start unit configured to start the post-reverse movement command in accordance with the start timing calculated by the timing calculation unit.

When directions of movement of two or more axes are reversed, the timing calculation unit may calculate, for each axis, the start timing of the post-reverse movement command whereby the position, where the sum of the velocities generated in response to the pre-reverse movement command and the post-reverse movement command becomes zero, is equal to a position distanced by the in-position width from the end position of the pre-reverse movement command, and the post-reverse movement command may be started in accordance with the latest start timing of the start timings calculated for each axis.

The timing calculation unit may store a plurality of in-position widths and may switch between the plurality of in-position widths in accordance with the processing mode or feed rate.

Due to being provided with the configuration described above, the present invention is able to provide a numerical control device for controlling a machine tool whereby, in an operation in which the direction of movement is reversed, the cycle time can be shortened by advancing the reverse start timing of the reversing operation, as early as possible, within the in-position width.

BRIEF DESCRIPTION OF THE DRAWINGS

The abovementioned and further objects and characteristic features of the present invention will become evident from the following description of the embodiments with reference to the drawings, in which.

DESCRIPTION OF THE PREFERRED EMBODIMENTS

Timing Calculation Unit

Figure 1:
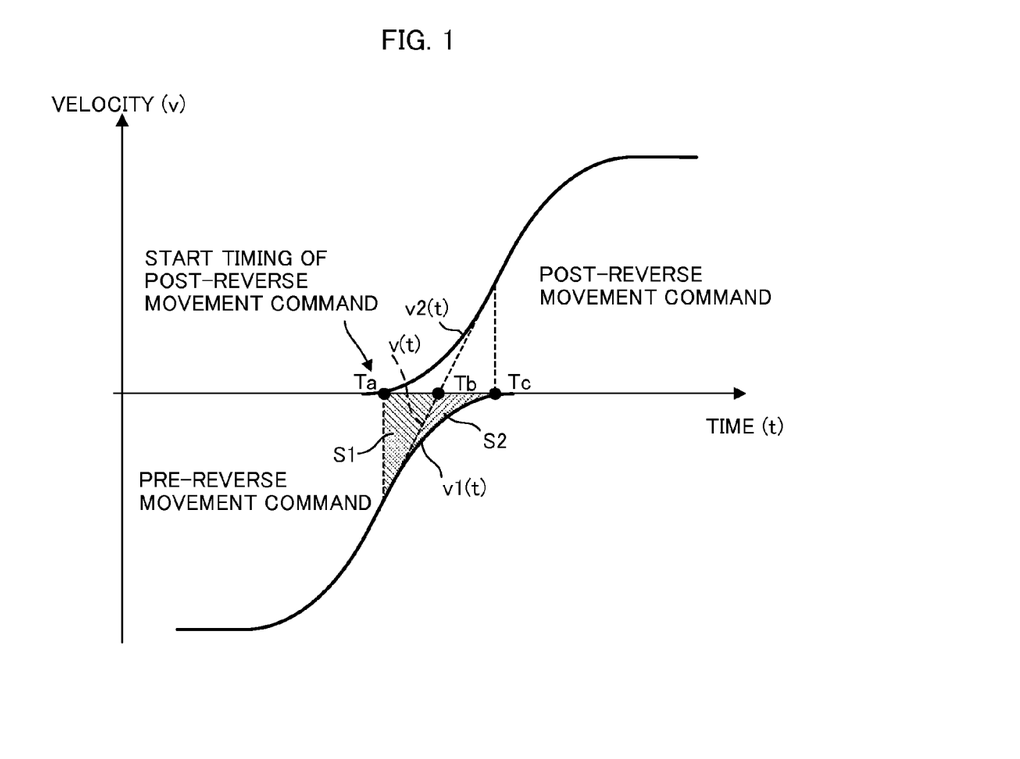
FIG. 1 is a diagram illustrating the start timing of a post-reverse movement command by the timing calculation unit.

A timing calculation unit which calculates the start timing of a reversing operation in the present invention will now be described. FIG. 1 is a diagram illustrating the start timing of a post-reverse movement command by the timing calculation unit. Firstly, the reference symbols will be explained.

$v1(t)$: velocity of pre-reverse movement command
$v2(t)$: velocity of post-reverse movement command
$v(t)$: sum of $v1$ and $v2$
Ta: start timing of post-reverse movement command
Tb: timing of reversal of movement command
Tc: completion timing of pre-reverse movement command
S1: amount of movement from Ta to Tb
S2: amount of insufficient travel at reversal Next, the method of determining the start timing Ta of the post-reverse movement command will be described. The start timing Ta of the post-reverse movement command is determined with respect to the velocity command $v2(t)$ in FIG. 1.

<1>

The completion timing Tc of the pre-reverse movement command is determined from the amount of movement of the pre-reverse movement command and the velocity $v1(t)$ of the pre-reverse movement command.

<2>

In (Expression 1) indicated below which represents the combined (sum) velocity $v(t)$ of the velocity $v1(t)$ of the pre-reverse movement command and the velocity $v2(t)$ of the post-reverse movement command, the timing Tb at which the movement command is reversed is determined by taking $v(t)=0$.

$$v(t)=v1(t)+v2(t) \quad \text{(Expression 1)}$$

<3>

When the in-position width when reversing is taken to be δ, then the absolute value of the amount of insufficient travel at reversal S2 and the start timing Ta of the post-reverse movement command when |S2|=δ, are determined from the timing Tb at which the movement command reverses, the completion timing Tc of the pre-reverse movement command, and (Expression 2). The in-position width is the required positioning accuracy (tolerable error), which means a prescribed range in which, when the positioning of the block being executed comes within this prescribed range of the target position, the movement of the next block is started.

The amount of movement S1 from Ta to Tb is expressed by (Expression 2).

$$S1=\int_{Ta}^{Tb} v(t)dt = \int_{Ta}^{Tb}(v1(t)+v2(t))dt \quad \text{(Expression 2)}$$

The sum of the amount of movement S1 from Ta to Tb and the amount of insufficient travel at reversal S2 is expressed by (Expression 3).

$$S1+S2=\int_{Ta}^{Tc} v1(t)dt \quad \text{(Expression 3)}$$

Therefore, the amount of insufficient travel at reversal S2 is expressed by (Expression 4).

$$S2=\int_{Ta}^{Tc} v1(t)dt - \int_{Ta}^{Tb}(v1(t)+v2(t))dt \quad \text{(Expression 4)}$$

The post-reverse movement command is started in accordance with the start timing Ta of the post-reverse movement command thus determined.

In the prior art, a post-reverse movement command is started when the value of S1+S2 in FIG. 1 becomes the in-position width δ, and therefore the post-reverse movement command has been started after Ta in FIG. 1.

In any of the embodiments of the present invention, since S2 (the amount of insufficient travel at reversal) is calculated accurately and the reverse command is started at timing Ta where the in-position width δ is reached, then it is possible to start the reversing operation by the reverse command, at an earlier time than in the prior art.

(Concrete Calculation Examples of Timing Calculation Unit)

Here, concrete calculation examples performed in the timing calculation unit will be described with reference to FIG. 2. Firstly, the reference symbols will be explained.

$v1(t)$: velocity of pre-reverse movement command
$v2(t)$: velocity of post-reverse movement command
$v(t)$: sum of $v1$ and $v2$
Ta: start timing of post-reverse movement command
Tb: timing of reversal of movement command
Tc: completion timing of pre-reverse movement command
S2: amount of insufficient travel at reversal
V: velocity (constant)
A: acceleration (constant)

Figure 2:
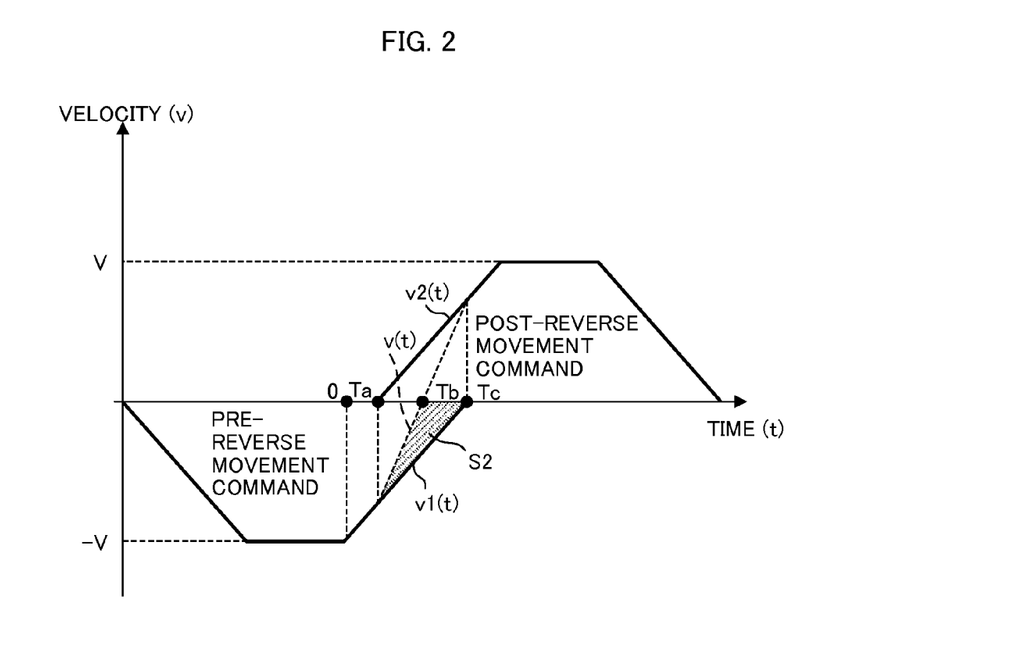
FIG. 2 is a diagram illustrating a specific calculation example by the timing calculation unit.

The start timing Ta of the post-reverse movement command shown in FIG. 2 is determined. In order to simplify the description, $v1(t)$ and $v2(t)$ are taken to have linear acceleration/deceleration, as shown in (Expression 5) and (Expression 6). Since the acceleration/deceleration is under consideration, the deceleration start timing of the pre-reverse movement command is set as t=0.

$$v1 = A*t - V (Ta \leq t \leq Tc) \quad \text{(Expression 5)}$$

$$v2 = A*(t-Ta)(Ta \leq t \leq Tc) \quad \text{(Expression 6)}$$

<1>

The completion timing Tc of the pre-reverse movement command is $v1=0$ in (Expression 5), and therefore Tc is determined by (Expression 7).

$$A*Tc - V = 0 \quad \text{(Expression 7)}$$
$$\therefore Tc = \frac{V}{A}$$

<2>

From (Expression 1), (Expression 5) and (Expression 6), the velocity v between Ta and Tc is determined by (Expression 8).

$$v = v1(t) + v2(t) \quad \text{(Expression 8)}$$
$$= 2A*t - V - A*Ta$$

Here, assuming v=0, then the timing Tb at which the movement command reverses is determined by (Expression 9).

$$2A*Tb - V - A*Ta = 0 \quad \text{(Expression 9)}$$
$$\therefore Tb = \frac{Ta}{2} + \frac{V}{2A}$$

<3>

From (Expression 4), (Expression 5) and (Expression 6), the amount of insufficient travel at reversal S2 is determined by (Expression 10).

$$S2 = \int_{Ta}^{Tc} v1(t)\,dt - \int_{Ta}^{Tb}(v1(t)+v2(t))\,dt \quad \text{(Expression 10)}$$
$$= \frac{A}{2}*Tc^2 - \frac{A}{2}*Ta^2 - V*Tc -$$
$$A*Tb^2 + V*Tb + A*Ta*Tb$$

When values for Tc and Tb are introduced from (Expression 7) and (Expression 9) into (Expression 10), S2 can be expressed as in (Expression 11).

$$S2 = \frac{V^2}{2A} - \frac{A}{2}*Ta^2 - \frac{V^2}{A} - A*\left(\frac{Ta}{2}+\frac{V}{2A}\right)^2 + V*\left(\frac{Ta}{2}+\frac{V}{2A}\right) + A*Ta*\left(\frac{Ta}{2}+\frac{V}{2A}\right) \quad \text{(Expression 11)}$$
$$= -\frac{A}{4}*Ta^2 + \frac{V}{2}*Ta - \frac{V^2}{4A}$$

When the in-position width when reversing is taken to be δ, then |S2|=δ in (Expression 11), and the expression in (Expression 12) is obtained.

$$\left| -\frac{A}{4}*Ta^2 + \frac{V}{2}*Ta - \frac{V^2}{4A} \right| = \delta \quad \text{(Expression 12)}$$

In this example, since S2<0, then S2 is expressed by (Expression 13), and when solved in respect of Ta, the start timing Ta of the post-reverse movement command is determined.

$$-\left[ -\frac{A}{4}*Ta^2 + \frac{V}{2}*Ta - \frac{V^2}{4A} \right] = \delta \quad \text{(Expression 13)}$$
$$\frac{A}{4}*Ta^2 - \frac{V}{2}*Ta + \frac{V^2}{4A} - \delta = 0$$
$$Ta = \frac{\frac{V}{2} \pm \sqrt{\frac{V^2}{4} - 4*\frac{A}{4}*\left(\frac{V^2}{4A}-\delta\right)}}{2*\left(\frac{A}{4}\right)} = \frac{V \pm 2\sqrt{A\delta}}{A}$$

By performing similar calculations for cases where v1(t) and v2(t) do not have linear acceleration/deceleration, it is possible to determine the start timing Ta of the post-reverse movement command. Consequently, by starting the post-reverse movement command in accordance with the start timing Ta of the post-reverse movement command determined in this way, it is possible to advance the reverse start timing, as early as possible, within the in-position (δ) width.

Next, a description is given of the relationship between the command path and the actual path when a post-reverse movement command is issued at the start timing of the post-reverse movement command as calculated by the timing calculation unit according to any of the embodiments of the present invention.

First Embodiment

The first embodiment is a case where the direction of movement is reversed by a movement command on one axis only (the path before and after reversal is the same). In the timing calculation unit, the start timing Ta of the post-reverse movement command is calculated from the single-axis velocity and acceleration, and the in-position width when reversing on one axis. An example of a processing program in this case is given below. This processing program includes a movement command for performing a reversing operation in the Y axis direction.

[Processing Program]
N1 G01 Y-10. F1000;
N2 G00 Y10.;
[Path Diagram]

Figure 3:
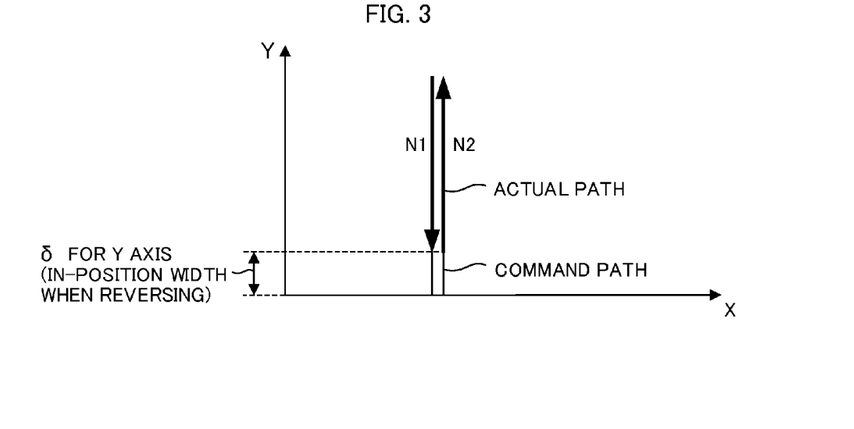
FIG. 3 is a diagram illustrating a path of movement when the direction of movement is reversed by a movement command on one axis only (the path before and after reversal is the same)

FIG. 3 is a diagram illustrating the path of movement when the direction of movement is reversed by a movement command on one axis only (the path before and after reversal is the same). Since δ (the in-position width when reversing) on the Y axis is 0.01 mm, A (acceleration) is 1000 mm/sec$^2$, and from F1000, V (velocity) is 1000 mm/min, then when (Expression 13) is solved, the start timing Ta of the post-reverse movement command is 0.0103 sec.

Consequently, by starting the post-reverse movement command (N2 command) in accordance with the start timing of the post-reverse movement command, Ta=0.0103 sec, while implementing the pre-reverse movement command (N1), it is possible to advance the reverse start timing, as early as possible, within the in-position δ width when reversing on the Y-axis. Here, an example is given in which the direction of movement is reversed between blocks, but there are also cases where the direction of movement is reversed within one block, as in a hole forming cycle.

Figure 4:
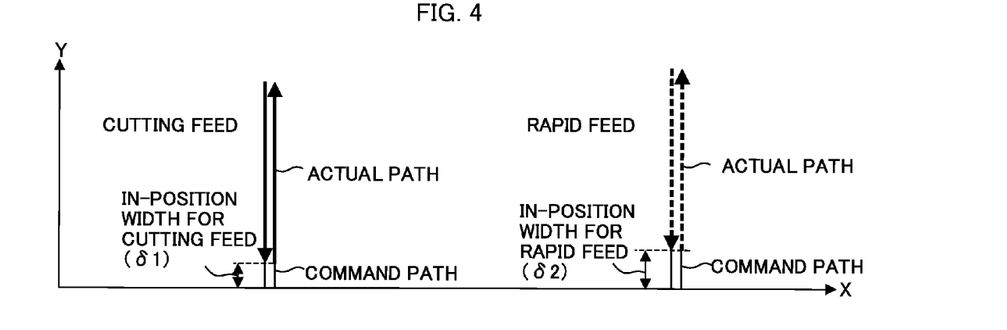
FIG. 4 illustrates the path in a case where the in-position width is used selectively in processing modes for cutting feed and rapid feed, and the direction of movement is reversed by a movement command on one-axis only (the path before and after reversal is the same)

FIG. 4 shows a case where the direction of movement is reversed by a movement command on one axis only (the path before and after reversal is the same), and illustrates the selective use of the in-position width in processing modes in the case of cutting feed and the case of rapid feed.

There are a plurality of in-position widths (δ), namely, the in-position widths (δ1, δ2, δ3); and the in-position widths may be used selectively for processing modes with cutting feed and for rapid feed, so that, as shown in FIG. 4, for example, the in-position width (δ1) is set as the in-position width (δ) for cutting feed, and the in-position width (δ2) is set as the in-position width (δ) in the first embodiment, for rapid feed.

Alternatively, the in-position widths may be used selectively in accordance with the feed rate, in such a manner that the in-position width (δ1) is set as the in-position width (δ) when the F command for the feed rate is smaller than a certain set value Fs, and the in-position width (δ3) is set as the in-position width (δ) according to the first embodiment, when the F command is greater than Fs.

Furthermore, depending on circumstances, it is also possible to use a combination of values, such as δ1+δ3, δ2+δ3, etc., as the in-position width (δ) in the first embodiment.

Using a plurality of in-position widths selectively in accordance with the circumstances in this way can also be applied to the embodiments described below.

Second Embodiment

The second embodiment is a case where the direction of movement is reversed by movement commands on two axes (the path before and after reversal is the same). N1 is a pre-reversal movement command, and N2 is a post-reverse movement command. The timing calculation unit calculates the velocity and acceleration in a tangential direction (combination of the X axis and Y axis), and the start timing Ta of the post-reverse movement command in the tangential direction, at the in-position width when reversing in the tangential direction (the value δ in the tangential direction).

Figure 5:
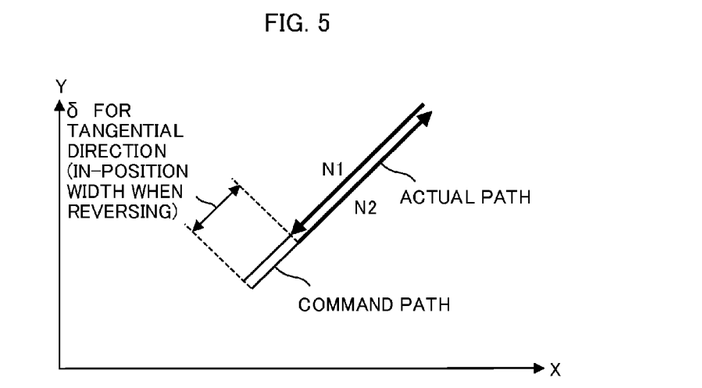
FIG. 5 is a diagram illustrating a path of movement when the direction of movement is reversed by a movement command on two axes (the path before and after reversal is the same)

[Processing Program]
N1 G01 X-10. Y-10. F1000;
N2 G00 X10. Y10.;

[Path Diagram]
FIG. 5 is a diagram illustrating a case where the direction of movement is reversed by a movement command on two axes (the path before and after reversal is the same). In the first embodiment, a calculation is made for one axis, but in the second embodiment, all calculations are made in the tangential direction (combination of axes). This latter calculation is the same as that of the first embodiment and therefore is omitted here.

Third Embodiment

Figure 6:
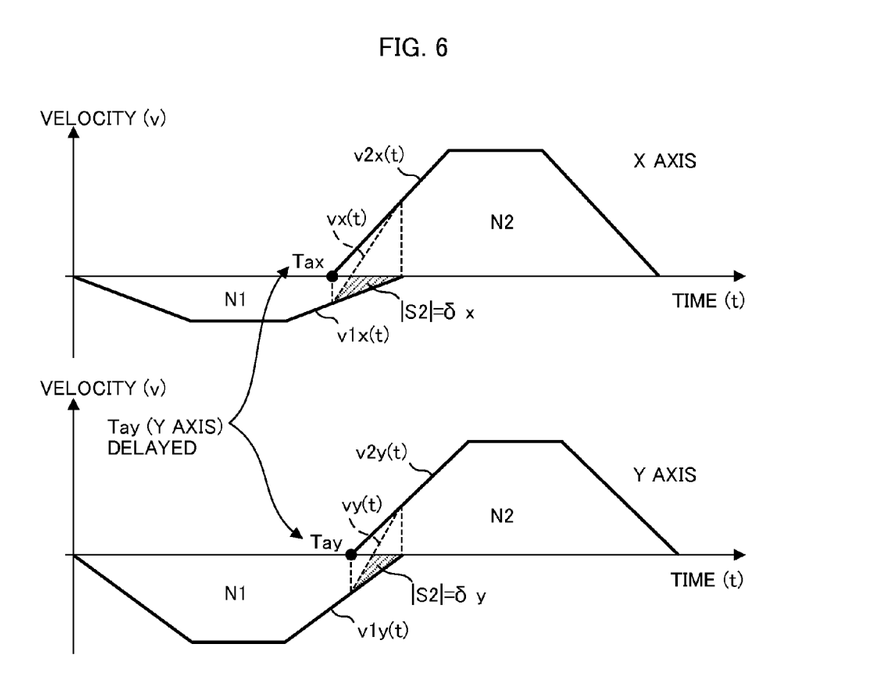
FIG. 6 is a diagram illustrating a start timing of post-reverse movement commands for each axis, in a case where the direction of movement is reversed by a movement command on two axes (the path before and after reversal is different)

The third embodiment is a case where the direction of movement is reversed by movement commands on two axes (the path before and after reversal is different). FIG. 6 is a diagram illustrating a case where the direction of movement is reversed by a movement command on two axes (the path before and after reversal is different). The timing calculation unit calculates the velocities and accelerations on each axis, and the start timings Tax (X axis) and Tay (Y axis) of the post-reverse movement commands for each axis, at the in-position width when reversing for each axis (X axis: δx; Y axis: δy). In order to satisfy the in-position widths when reversing for all of the axes, Tax (X axis) and Tay (Y axis) are compared, and the later timing (the timing Tay (Y axis) in FIG. 6 and FIG. 7) is employed.

[Processing Program]
N1 G01 X-5. Y-10. F1000;
N2 G00 X10. Y7.;

The start timing Tax of the X-axis post-reverse movement command can be determined by solving in respect of the start timing Ta of the post-reverse movement command, on the basis of the velocity and acceleration of the X axis, δx (the in-position width when reversing on the X axis), and (Expression 4), using the amount of insufficient travel at reversal, $|S2|=\delta x$.

Furthermore, the start timing Tay of the Y-axis post-reverse movement command can be determined by solving in respect of the start timing Ta of the post-reverse movement command, on the basis of the velocity and acceleration of the Y axis, δy (the in-position width when reversing on the Y axis), and (Expression 4), using the amount of insufficient travel at reversal, $|S2|=\delta y$.

The calculation of the start timing of the post-reverse movement commands on the respective axes is similar to that in the first embodiment and therefore is not described here.

Figure 7:
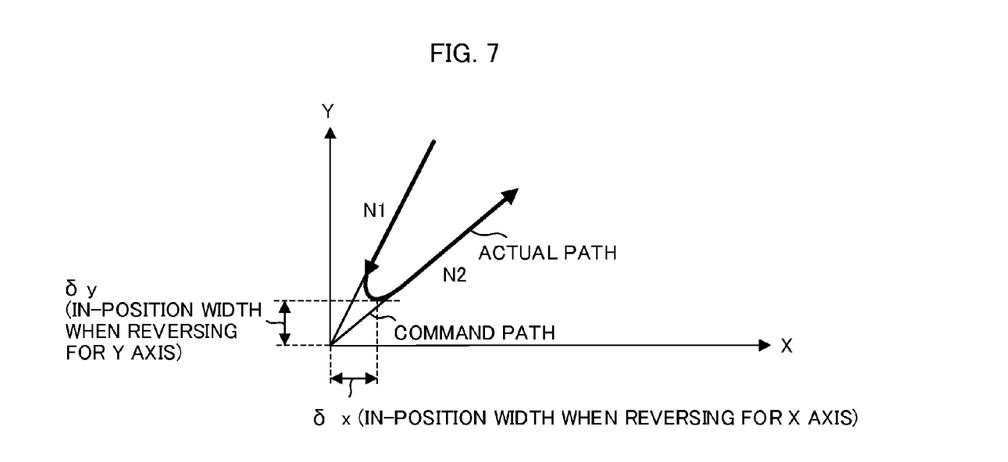
FIG. 7 is a diagram illustrating the path of movement when the direction of movement is reversed by a movement command on two axes (the path before and after reversal is different)

The Tax (X axis) and Tay (Y axis) determined in this way are compared, and the post-reverse movement command (N2 command) is started at the later timing (the timing Tay (Y axis) in FIG. 6 and FIG. 7). Consequently, it is possible to advance the reverse start timing, as early as possible, within the in-position widths when reversing for all axes.

Figure 8:
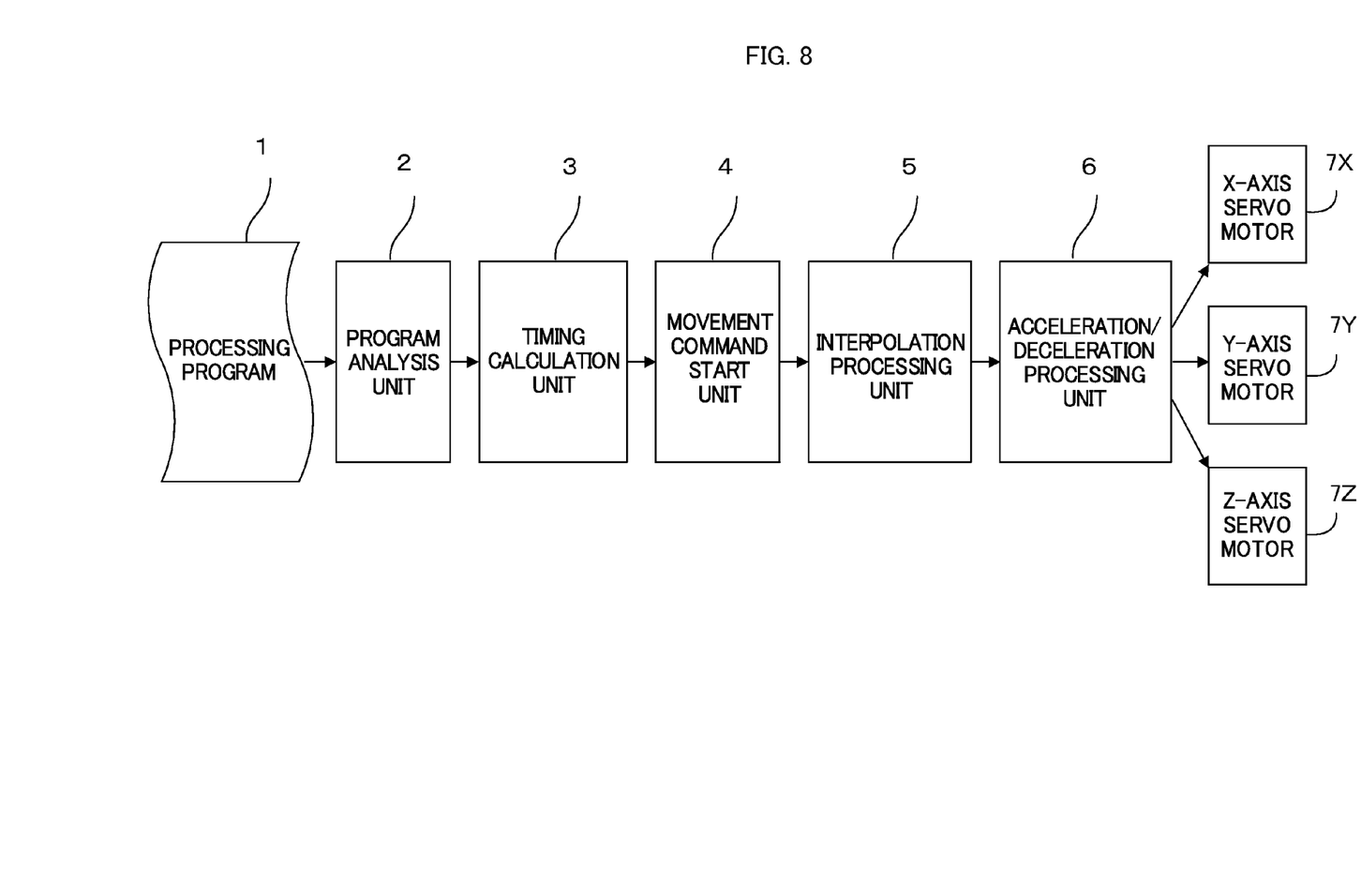
FIG. 8 is a functional block diagram of a numerical control device relating to one embodiment.

FIG. 8 is a functional block diagram of a numerical control device relating to the present embodiment. In general, a numerical control device creates analytical data by reading and analyzing a processing program 1 in a program analysis unit 2. Movement (interpolated movement) based on the analytical data is started by a movement command start unit 4, interpolated data is created by interpolation based on the analytical data in an interpolation processing unit 5, acceleration/deceleration is applied to the interpolated data by an acceleration/deceleration processing unit 6, and servo motors of the respective axes (X-axis servo motor 7X, Y-axis servo motor 7Y, Z-axis servo motor 7Z) are driven. In the present embodiment, a timing calculation unit 3 is provided between the program analysis unit 2 and the movement command start unit 4, and the movement command start unit 4 starts a post-reverse movement command in accordance with the start timing calculated by the timing calculation unit 3.

Figure 9:
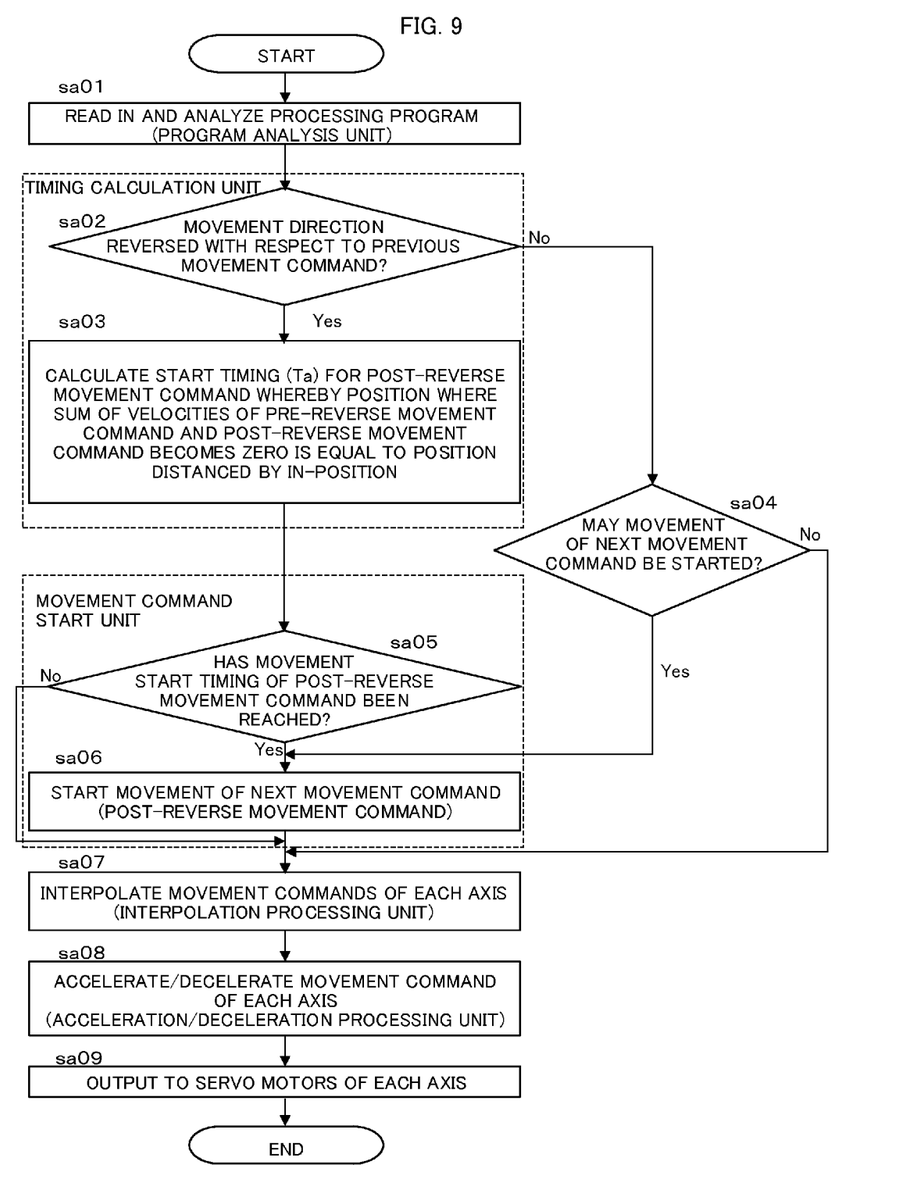
FIG. 9 is a drawing showing a flow of processing relating to one embodiment.

FIG. 9 is a drawing showing a schematic view of a system relating to the present embodiment. FIG. 9 shows a flowchart from the reading in and analysis of the processing program, up to the output for controlling driving of the servo motors of the respective axes. The timing calculation unit and the movement command start unit are the characteristic units of the present embodiment. This is described below on the basis of the respective steps.

[Step sa01] The processing program is read in and analyzed (program analysis unit).

[Step sa02] It is determined whether or not the direction of movement is reversed with respect to the previous movement command, and if the direction is reversed (yes), then the procedure transfers to step sa03, whereas if the direction is not reversed (no), then the procedure transfers to step sa04.

[Step sa03] The start timing (Ta) of the post-reverse movement command is calculated in such a manner that the position when the sum velocity of the pre-reverse movement command and the post-reverse movement command is zero, is equal to a position distanced by the in-position width from the end position of the pre-reverse movement command.

[Step sa04] It is determined whether or not movement of the next movement command may be started, and if movement may be started (yes), then the procedure transfers to step sa06, whereas is movement may not be started (no), then the procedure transfers to step sa07.

[Step sa05] It is determined whether or not the movement start timing of the post-reverse movement command has been reached, and if the movement start timing has been reached (yes), the procedure transfers to step sa06, whereas if this timing has not been reach (no), the procedure transfers to step sa07.

[Step sa06] The movement of the next movement command (post-reverse movement command) is started.

[Step sa07] The movement commands of each axis are interpolated (interpolation processing unit).

[Step sa08] Acceleration/deceleration processing is applied to the movement commands of each axis (acceleration/deceleration processing unit).

[Step sa09] Movement commands are output to the servo motors of each axis.

A supplementary explanation of the flowchart is now given. step sa01 corresponds to the program analysis unit 2. Step sa02 and step sa03 correspond to the timing calculation unit 3. Steps sa05 and sa06 correspond to the movement command start unit 4. Step sa07 corresponds to the interpolation processing unit 5. Step sa08 corresponds to the acceleration/deceleration processing unit 6.

What is claimed is:

1. A numerical control device for a machine tool, comprising:
    a program analysis unit configured to read in and analyze a processing program for processing an object by controlling axes of the machine tool, the processing program including a command by which the direction of movement of one or more axes is reversed;
    a timing calculation unit configured to calculate a start timing of a post-reverse movement command by which a position, where a sum of the velocities generated in response to a pre-reverse movement command and the post-reverse movement command becomes zero, is equal to a position distanced by an in-position width from an end position of the pre-reverse movement command;
    a movement command start unit configured to start the post-reverse movement command in accordance with the start timing calculated by the timing calculation unit,
    wherein the numerical control device is configured to drive the one or more axes of the machine tool to process the object according to the post-reverse movement command.

2. The numerical control device for a machine tool according to claim 1, wherein the timing calculation unit is configured to calculate, when directions of movement of two or more axes are reversed, for each axis, the start timing of the post-reverse movement command by which the position, where the sum of the velocities generated in response to the pre-reverse movement command and the post-reverse movement command becomes zero, is equal to a position distanced by the in-position width from the end position of the pre-reverse movement command, and start the post-reverse movement command in accordance with the latest start timing of start timings calculated for each axis.

3. The numerical control device for a machine tool according to claim 1, wherein the timing calculation unit stores a plurality of in-position widths, and is configured to switch between the plurality of in-position widths in accordance with a processing mode or feed rate.

4. The numerical control device for a machine tool according to claim 2, wherein the timing calculation unit stores a plurality of in-position widths, and is configured to switch between the plurality of in-position widths in accordance with a processing mode or feed rate.

* * * * *